US009689265B2

(12) United States Patent
de Diego

(10) Patent No.: US 9,689,265 B2
(45) Date of Patent: Jun. 27, 2017

(54) THIN-WALLED REINFORCEMENT LATTICE STRUCTURE FOR HOLLOW CMC BUCKETS

(75) Inventor: Peter de Diego, Saluda, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1391 days.

(21) Appl. No.: 13/442,077

(22) Filed: Apr. 9, 2012

(65) Prior Publication Data

US 2015/0369052 A1 Dec. 24, 2015

(51) Int. Cl.

*B23P 15/04* (2006.01)
*F01D 5/14* (2006.01)
*F01D 5/28* (2006.01)

(52) U.S. Cl.

CPC ............. *F01D 5/147* (2013.01); *F01D 5/282* (2013.01); *F01D 5/284* (2013.01); *F05D 2220/30* (2013.01); *F05D 2230/60* (2013.01); *F05D 2260/96* (2013.01); *F05D 2300/20* (2013.01); *Y10T 29/49339* (2015.01)

(58) Field of Classification Search

CPC ........ F01D 5/147; F01D 5/3084; F01D 5/282; F01D 5/284; F01D 5/188; F01D 5/14; F01D 9/044; F01D 5/16; F05D 2300/702; F05D 2300/6033; B23P 15/04; Y10T 29/49337; Y10T 29/49336; Y10T 428/2973; Y02P 70/523; B22C 9/103; B21C 25/08; B22D 19/00; B22D 29/001; B22D 25/00

USPC ..................................... 416/90, 95; 415/115

See application file for complete search history.

(56) References Cited

U.S. PATENT DOCUMENTS

| | | | | |
|---|---|---|---|---|
| 3,378,228 A * | 4/1968 | Twiston | .................... | F01D 5/18 415/217.1 |
| 4,285,634 A | 8/1981 | Rossman et al. | | |
| 4,440,834 A | 4/1984 | Aubert et al. | | |
| 5,348,446 A | 9/1994 | Lee et al. | | |
| 5,403,153 A | 4/1995 | Goetze | | |
| 5,626,462 A | 5/1997 | Jackson et al. | | |
| 6,544,003 B1 | 4/2003 | Grylls et al. | | |
| 6,609,884 B2 | 8/2003 | Harvey | | |
| 7,625,180 B1 | 12/2009 | Liang | | |
| 7,674,093 B2 | 3/2010 | Lee et al. | | |

(Continued)

FOREIGN PATENT DOCUMENTS

| | | | | |
|---|---|---|---|---|
| CN | 1931475 A | 3/2007 | | |
| GB | 619634 A | 3/1949 | | |
| WO | WO 2007081347 A2 * | 7/2007 | ............... | F01D 5/14 |

OTHER PUBLICATIONS

Unofficial English Translation of Chinese Office Action issued in connection with corresponding CN Application No. 201310049970.6 on Jul. 3, 2015.

*Primary Examiner* — M. Laurenzi
*Assistant Examiner* — Anthony Ayala Delgado
(74) *Attorney, Agent, or Firm* — Nixon & Vanderhye P.C.

(57) ABSTRACT

A hollow ceramic matrix composite (CMC) turbine bucket with an internal reinforcement lattice structure has improved vibration properties and stiffness. The lattice structure is formed of thin-walled plies made of CMC. The wall structures are arranged and located according to high stress areas within the hollow bucket. After the melt infiltration process, the mandrels melt away, leaving the wall structure to become the internal lattice reinforcement structure of the bucket.

12 Claims, 4 Drawing Sheets

(56) References Cited

U.S. PATENT DOCUMENTS

| | | | | |
|---|---|---|---|---|
| 8,167,537 | B1 * | 5/2012 | Plank | F01D 5/147<br>415/115 |
| 8,740,571 | B2 * | 6/2014 | Garcia-Crespo | F01D 5/147<br>29/889.7 |
| 2006/0039793 | A1 * | 2/2006 | Grote | C21B 7/06<br>416/241 B |
| 2007/0140835 | A1 | 6/2007 | Albrecht et al. | |
| 2010/0189556 | A1 * | 7/2010 | Propheter-Hinckley | F01D 5/284<br>415/200 |
| 2013/0084189 | A1 * | 4/2013 | Diego | C04B 37/001<br>416/241 B |

* cited by examiner

THIN-WALLED REINFORCEMENT LATTICE STRUCTURE FOR HOLLOW CMC BUCKETS

GOVERNMENT INTERESTS

The subject invention was made with United States Government support under contract number DE-FC26-05NT42643 awarded by the Department of Energy. The Government has certain rights in this invention.

BACKGROUND OF THE INVENTION

The invention relates generally to turbine buckets and, more particularly, to turbine buckets including an internal reinforcement lattice structure that serves to improve stiffness and vibration properties.

In a gas turbine engine, air is pressurized in a compressor and mixed with fuel in a combustor for generating hot combustion gases. Energy is extracted from the gases in turbine stages for powering the compressor and performing external work.

Each turbine stage includes a stationary turbine nozzle having a row of nozzle vanes that discharge the combustion gases into a corresponding row of turbine rotor blades or buckets. Each blade includes an airfoil extending radially outwardly in span from an integral platform defining a radially inner flowpath boundary. The platform is integrally joined to a supporting dovetail having corresponding lobes mounted in a dovetail slot formed in the perimeter of a supporting rotor disk.

The turbine blades are typically hollow with internal cooling circuits therein specifically configured for cooling the different portions of the airfoil against the different heat loads from the combustion gases flowing thereover during operation.

The turbine airfoil includes a generally concave pressure side and circumferentially opposite, generally convex suction side, which extend radially in span from a root at the platform to a radially outer tip, and which extend axially in chord between opposite leading and trailing edges. The airfoil has the typical crescent radial profile or section that rapidly increases in thickness aft from the leading edge to the maximum width or hump region of the airfoil, which then gradually tapers and decreases in width to the relatively thin trailing edge of the airfoil.

In constructing a typical CMC (ceramic matrix composite) blade, plies are laid up onto the tooling surface from one side of the blade (either suction side or pressure side). As the layup process continues, the plies reach the midpoint or center of the blade airfoil. At this point, a mandrel is inserted into the tool, which produces the hollow cavity when the mandrel material is melted out. This mandrel contains ply wraps that produce the vertical "root to tip" thin walled features. The mandrel can be made from a variety of different materials, including, for example, pure tin, tin alloy, or an absorbable mandrel made from silicon/boron may be used. After the mandrel has been placed into the tool, the blade layup process continues through the blade.

In the current fabrication process, the blade has a tendency to uncamber or otherwise lose its curved airfoil shape. Additionally, existing buckets would benefit from improved stiffness and vibration properties.

BRIEF DESCRIPTION OF THE INVENTION

In an exemplary embodiment, a mandrel assembly for manufacturing a ceramic matrix composite (CMC) turbine blade includes a tip section including a pressure side and a suction side, and a root section including a pressure side and a suction side. A plurality of CMC plies are laid up from one side to the other between the tip section and the root section.

In another exemplary embodiment, a turbine bucket is assembled using a multi-part mandrel with ceramic matrix composite (CMC) plies interposed between parts of the mandrel. The turbine bucket includes a pressure side and a suction side formed in an airfoil shape. The pressure side and the suction side are spaced and define a hollow central section. The CMC plies define internal reinforcement lattice structure within the hollow central section.

In yet another exemplary embodiment, a method of constructing a turbine bucket includes the steps of (a) assembling a mandrel including a tip section with a pressure side and a suction side, a root section with a pressure side and a suction side, and a plurality of ceramic matrix composite (CMC) plies laid up between the tip section and the root section; (b) wrapping the mandrel with CMC layers on the pressure side and the suction side, and securing the pressure side to the suction side; and (c) removing the mandrel.

DETAILED DESCRIPTION OF THE INVENTION

Figure 1:
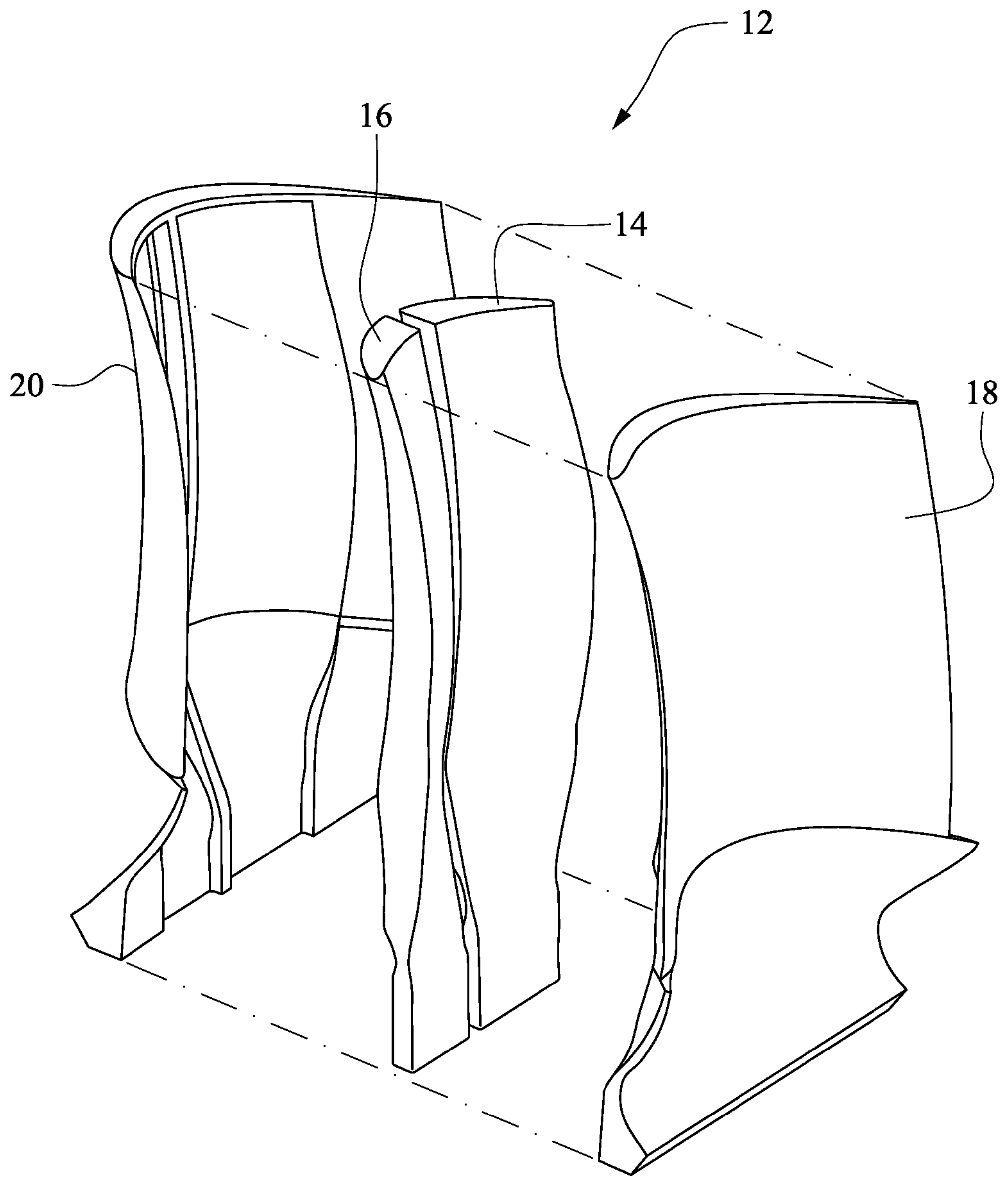
Fig. 1 (Prior Art)
FIG. 1 shows the current CMC bucket split mold construction.

FIG. 1 shows the current CMC bucket split mold construction. A mandrel 12 includes a leading edge section 14 and a trailing edge section 16 that are bolted together. The mandrel 12 is typically made of tin. The mandrel is wrapped with CMC layers on a pressure side to form a pressure side 18 of the bucket and corresponding CMC layers on a suction side to form a suction side 20 of the bucket. The pressure side 18 and the suction side 20 are secured together, and the mandrel 12 is removed, typically by a melting process.

Figure 2:
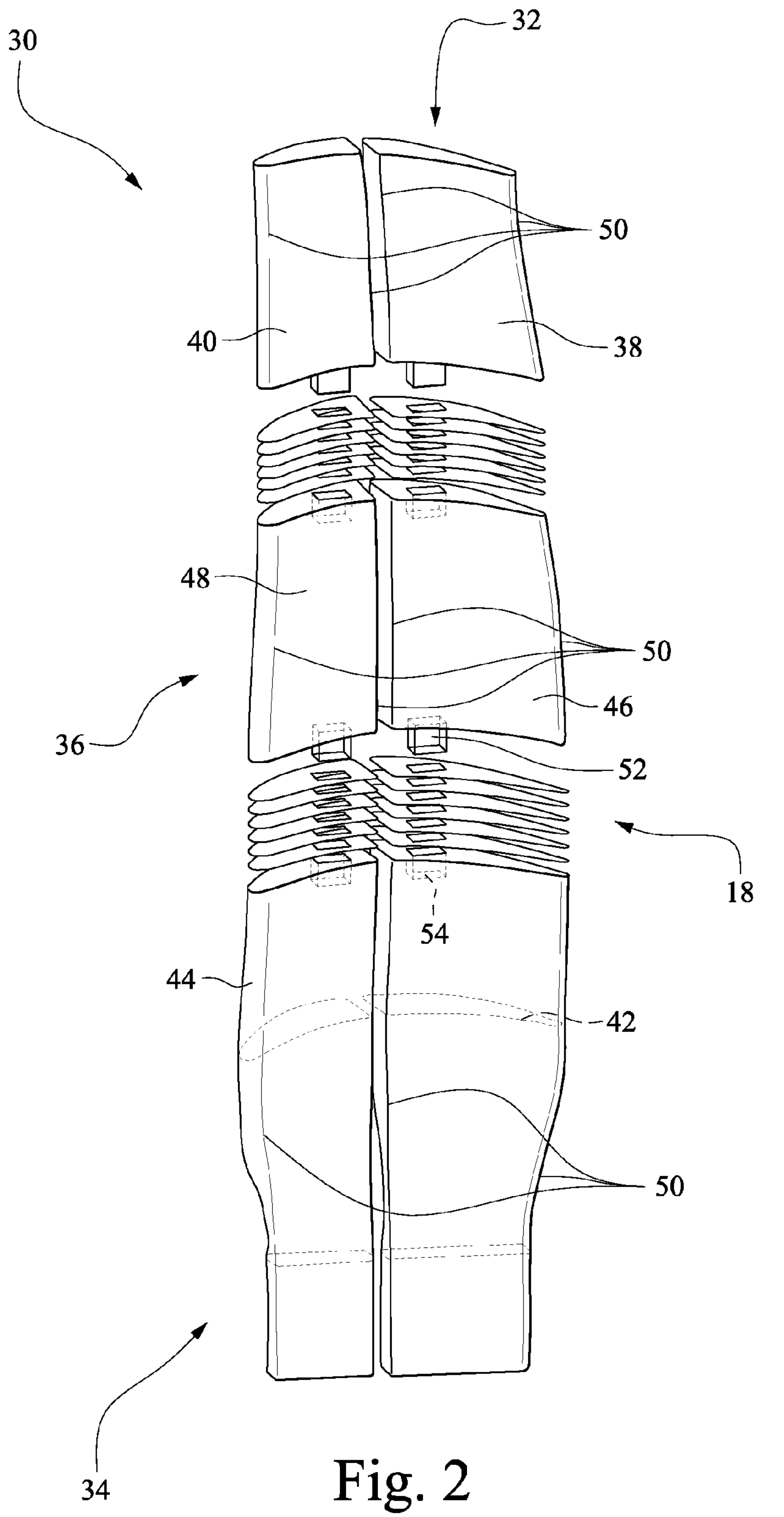
FIG. 2 shows an exemplary mandrel assembly including CMC plies.

With reference to FIG. 2, the invention provides a hollow CMC bucket with an internal reinforcement lattice structure in order to improve stiffness and vibration properties. The mandrel assembly shown in FIG. 2 includes a tip section 32 with a pressure side and a suction side and a root section 34 also with a pressure side and a suction side. One or more middle sections 36 may be interposed between the tip section 32 and the root section 34. In a preferred construction, the tip section 32 includes a leading edge part 38 connected to a trailing edge part 40. Similarly, the root section 34 includes a leading edge part 42 and a trailing edge part 44, and the middle section 36 includes a leading edge part 46 and a trailing edge part 48. Each of the parts is provided with a perimeter wall 50 that defines a cavity. During assembly, after wrapping the mandrels with CMC layers, the cavities defined by the perimeter walls 50 provide for hollow sections within the bucket.

Figure 3:
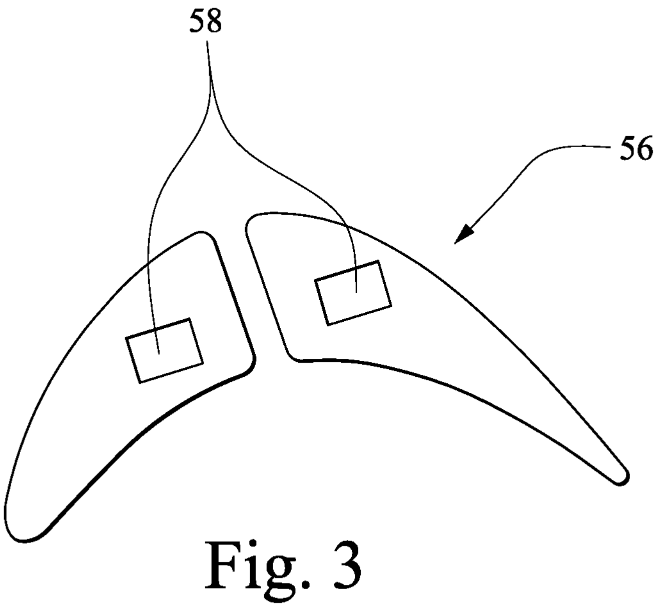
FIG. 3 is a plan view of the CMC plies.
Figure 4:
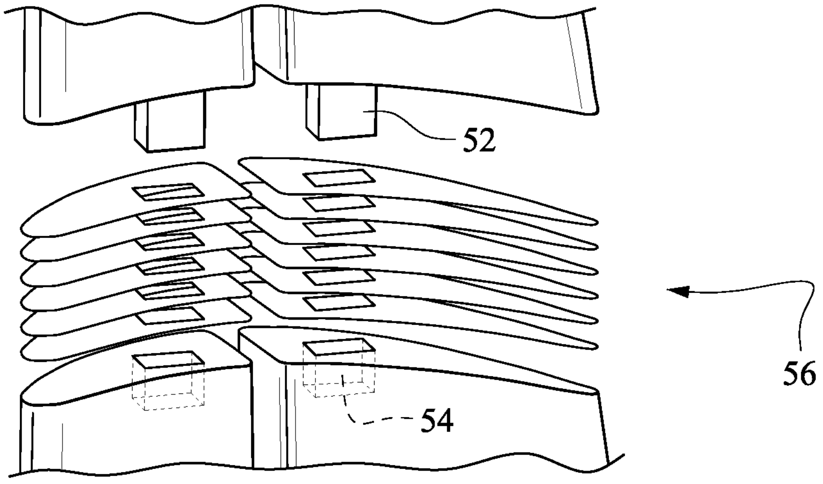
FIG. 4 is a close-up view of the connecting and alignment structure.

With reference to FIGS. 2 and 4, the mandrel sections are connected to one another via an alignment tab 52 and alignment slot 54. Prior to assembly of the mandrel, a plurality of CMC plies 56 are laid up (at multiple locations)

and are interposed between the various mandrel sections 32, 34, 36. As shown in FIG. 3, the CMC plies 56 are shaped corresponding to a cross-section of the respective parts of the tip section and the root section between which the CMC plies 56 are disposed. The CMC plies 56 include alignment openings 58 through which respective ones of the alignment tabs 52 are disposed in engagement with the tab slots 54. In an exemplary construction, after assembly of the bucket, the mandrel sections 32, 34, 36 are removed in a melt out stage where the mandrel sections melt through the alignment openings 58 in the CMC plies 56.

The alignment tabs 52 are shown as rectangle shapes located at the bottom of the mandrel parts. The alignment tabs 52 interlock together the set of mandrels below, in between which is the stack "sandwich of plies" that has that same opening so they can be inserted into place. Other shapes for the alignment tabs 52 and tab slots 54 may be suitable, such as, without limitation, triangle, square, cross, T-shape, and other geometrical shapes. A Phillips cross (male boss) can be used to lock the mandrels in place.

Figure 5:
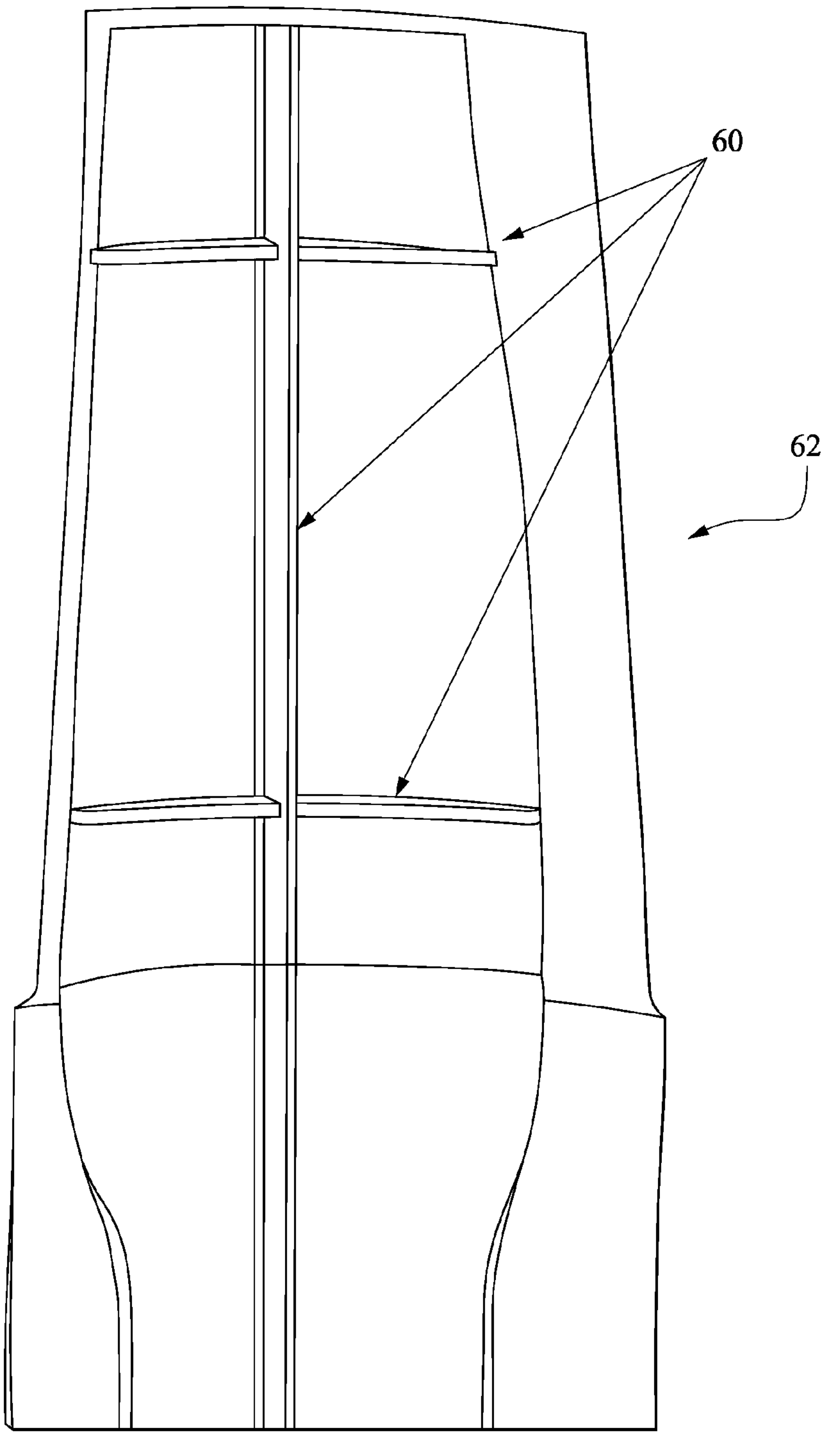
FIG. 5 shows a hollow CMC blade manufactured with the mandrel assembly shown in FIGS. 2-4.

After the melt out process, with reference to FIG. 5, a CMC thin-walled reinforcement lattice structure 60 is created that provides additional stiffness and improved vibration to the hollow airfoil 62 formed of the CMC layers. The bucket remains lightweight and has multiple openings that permit gas flow or pressurization within internal cavities. The wall structures are preferably arranged and located according to high stress areas within the hollow bucket.

In a method of constructing a turbine bucket, the mandrel 30 is assembled including at least a tip section 32 with a pressure side and a suction side, a root section 34 with a pressure side and a suction side, and the CMC plies 56 laid up from one side to the other between the tip section 32 and the root section 34. The mandrel 30 is wrapped with CMC layers on the pressure side and the suction side, and the pressure side and suction side are secured together. Subsequently, the mandrel sections 32, 34 are removed, and the CMC layers and CMC reinforcement structure define the turbine bucket.

The lattice structure serves to prevent blade uncambering during the fabrication process. Additionally, the CMC plies add reinforcement while improving vibration qualities at high stress areas in the airfoil. The reinforcement structure similarly improves stiffness of the turbine bucket while maintaining a lightweight construction.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A mandrel assembly for manufacturing a CMC turbine blade, the mandrel assembly comprising:

a tip section including a pressure side and a suction side;

a root section including a pressure side and a suction side; and a plurality of ceramic matrix composite (CMC) plies laid up from one side to the other across a cross section of the mandrel assembly and interposed between the tip section and the root section, the plurality of CMC plies defining reinforcement lattice structure within the CMC turbine blade, wherein the tip section comprises a leading edge part connected to a trailing edge part, and wherein the root section comprises a leading edge part connected to a trailing edge part, wherein one of the leading edge part of the tip section and the leading edge part of the root section comprises a connector on an end facing the other of the leading edge part of the tip section and the leading edge part of the root section, and wherein the other of the leading edge part of the tip section and the leading edge part of the root section comprises a connector receiver on an end facing the one of the leading edge part of the tip section and the leading edge part of the root section, and wherein one of the trailing edge part of the tip section and the trailing edge part of the root section comprises a connector on an end facing the other of the trailing edge part of the tip section and the trailing edge part of the root section, and wherein the other of the trailing edge part of the tip section and the trailing edge part of the root section comprises a connector receiver on an end facing the one of the trailing edge part of the tip section and the trailing edge part of the root section, the plurality of CMC plies each including an alignment opening through which respective ones of the connectors are disposed in engagement with the connector receivers.

2. A mandrel assembly according to claim 1, wherein each of the leading edge parts and the trailing edge parts includes a perimeter wall that defines a cavity.

3. A mandrel assembly according to claim 1, comprising a plurality of the CMC plies laid up between both (1) the leading edge parts of the tip section and the root section and (2) the trailing edge parts of the tip section and the root section.

4. A mandrel assembly according to claim 3, wherein each of the CMC plies is shaped corresponding to a cross-section of the respective parts of the tip section and the root section between which the CMC plies are disposed.

5. A mandrel assembly according to claim 1, further comprising a middle section including a pressure side and a suction side, the middle section being interposed between the tip section and the root section.

6. A mandrel assembly for manufacturing a CMC turbine blade, the mandrel assembly comprising:

a tip section including a pressure side and a suction side;

a root section including a pressure side and a suction side; and a plurality of ceramic matrix composite (CMC) plies laid up from one side to the other across a cross section of the mandrel assembly and interposed between the tip section and the root section, the plurality of CMC plies defining reinforcement lattice structure within the CMC turbine blade, wherein one of the tip section and the root section comprises a connector on an end facing the other of the tip section and the root section, and wherein the other of the tip section and the root section comprises a connector receiver on an end facing the one of the tip section and the root section, the plurality of CMC plies including an alignment opening through which the connector is disposed in engagement with the connector receiver.

7. A mandrel assembly for manufacturing a CMC turbine blade, the mandrel assembly comprising:

a tip section including a pressure side and a suction side:

a root section including a pressure &de and a suction side: and a plurality of ceramic matrix composite (CMC) plies laid up from one side to the other across a cross section of the mandrel assembly and interposed between the tip section and the root section, the plurality of CMC plies defining reinforcement lattice structure within the CMC turbine blade, wherein the tip section and the root section each comprises multiple parts that interlock with each other using a plurality of alignment tabs and a plurality of tab receivers, and wherein the CMC plies comprise a plurality of alignment openings through which the plurality of alignment tabs are disposed.

8. A method of constructing a turbine bucket, the method comprising:

(a) assembling a mandrel including a tip section with a pressure side and a suction side, a root section with a pressure side and a suction side, and a plurality of ceramic matrix composite (CMC) plies laid up from one side to the other across a cross section of the mandrel and interposed between the tip section and the root section;

(b) wrapping the mandrel with CMC layers on the pressure side and the suction side, and securing the pressure side to the suction side; and (c) removing the mandrel such that the plurality of CMC plies define cross-sectional reinforcement lattice structure within the turbine bucket, wherein step (a) is practiced by connecting the tip section of the mandrel with the root section of the mandrel via a tab and slot, and by securing the CMC plies using an alignment opening in the CMC plies with the tab extending through the alignment opening.

9. A method according to claim 8, wherein step (c) is practiced by melting the mandrel through the alignment opening.

10. A method according to claim 8, wherein step (b) is practiced by forming the CMC layers into an airfoil shape.

11. A method according to claim 8, wherein step (a) is practiced such that the CMC plies are positioned according to high stress areas of the bucket.

12. A method according to claim 8, wherein the tip section and the root section of the mandrel include internal cavities, and wherein step (b) is practiced such that the turbine bucket includes hollow cavities separated by internal walls reinforced with the CMC plies.

* * * * *